US005258063A

United States Patent [19]

Cifuentes et al.

[11] Patent Number: 5,258,063
[45] Date of Patent: Nov. 2, 1993

[54] POLISH CONTAINING SILYLATED DERIVATIVES OF ORGANIC AMINES AND EPOXIDES

[75] Inventors: Martin E. Cifuentes; David B. Selley, both of Midland, Mich.

[73] Assignee: Dow Corning Corporation, Midland, Mich.

[21] Appl. No.: 880,924

[22] Filed: May 11, 1992

[51] Int. Cl.⁵ .......................... C09G 1/06; C09G 1/12
[52] U.S. Cl. .......................................... 106/3; 106/10; 106/287.11; 106/287.13
[58] Field of Search ............ 106/3, 10, 287.11, 287.13

[56] References Cited

U.S. PATENT DOCUMENTS

| | | | |
|---|---|---|---|
| 3,836,371 | 9/1974 | Kokoszka | 106/11 |
| 3,927,042 | 12/1975 | Gölitz et al. | 106/287.11 |
| 4,036,787 | 7/1977 | Blount | 106/287.11 |
| 4,273,584 | 6/1981 | D'Angelo et al. | 106/8 |
| 5,017,222 | 5/1991 | Cifuentes | 106/10 |
| 5,063,260 | 11/1991 | Chen et al. | 106/287.11 |

*Primary Examiner*—Helene Klemanski
*Attorney, Agent, or Firm*—James L. DeCesare

[57] ABSTRACT

A polish formulation containing as components thereof at least one member selected from the group consisting of waxes, solvents, surfactants, film formers, abrasives and other ingredients normally used in making polishes. The improvement resides in incorporating into the polish formulation as a film former a silylated polycycloaliphatic amine or epoxide.

21 Claims, No Drawings

POLISH CONTAINING SILYLATED DERIVATIVES OF ORGANIC AMINES AND EPOXIDES

BACKGROUND OF THE INVENTION

This invention relates to a polish formulation and more particularly to a polish formulation containing a novel additive which is the reaction product of an organosilicon compound and an organic amine or epoxide. The resulting polish exhibits improved protection of automotive top coats against abrasion and corrosion, and forms light stable coatings.

Polishes are used to produce a glossy finish on a surface as well as to prolong the useful life of the surface. The gloss provided by the polish is the result of components in the polish which leave a coating and that function to smooth and clean the surface. Floor polish, furniture polish, and shoe polish rely upon a deposited film. Car and boat polish formulations result in a glossy and protective film and may contain abrasives for removing weathered paint and soil as well as old built-up polish. Metal polishes contain ingredients for abrasive smoothing of the surface being treated and for surface cleaning as well as components that function to remove and retard the build-up of tarnish.

Motor vehicle polish is specially formulated in order to remove road film and oxidized paint and to provide a continuous glossy film which resists water and its removal by water and car wash detergents. Such vehicle polishes contain several major functional ingredients including an abrasive. The abrasive however must be mild enough to avoid scratching of the painted surface and representative of such mild acting materials are fine grades of aluminum silicate, diatomaceous earth and silica. Straight and branched chain aliphatic hydrocarbons are employed to facilitate the detergency of the polish against oil based traffic soils and debris and provide solvency characteristics necessary in the production of a stable formulation. These hydrocarbons also control the drying rate of the formulation. Wax constitutes another polish ingredient and is one of the two film forming materials in the polish. The wax is spread and leveled and produces a high luster following buffing of the surface. Blends of soft and hard wax are often employed in order to facilitate ease of buffing and durability of the polish against environmental antagonists. Exemplary waxes are paraffin wax, microcrystalline petroleum wax, carnauba wax, candelilla vegetable wax, montan coal derived wax and synthetic polymeric waxes such as oxidized polyethylene.

Silicone materials are included in polishes as the other film forming ingredient. Such silicone materials also function as lubricants for easing the application of the polish as well as its buffing and act as release agents for dried abrasive. The silicone materials spread easily, provide a uniform high gloss and water repellency. Such materials typically are dimethylsilicones however aminofunctional silicone products are also employed. The aminofunctional silicone products result in films having increased resistance to removal from the surface by detergents and the environment as a result of their ability to plate out on a painted surface and to crosslink and bond to that surface.

A car polish may also contain an emulsifier, a thickner, and a stabilizer for the production of a homogenous stable product of desired consistency. Such polishes may be solid in form, semisolid, presoftened or liquid. The polish can be solvent based or an emulsion and in either case the polish may be a liquid, semi-solid or solid in constitution. Typically liquid emulsions include five to twenty weight percent of an abrasive, ten to thirty-five weight percent of solvent, two to fifteen weight percent of a silicone material and up to about five weight percent wax. In an emulsion paste formulation the wax ingredient is increased in level from there to twenty-five weight percent.

Polish formulations containing organosilicon compounds are not new. For example aminofunctional siloxanes have been employed in polish formulations as shown in U.S. Pat. No. 3,508,933 issued Apr. 28, 1970. Such aminofunctional silicones are also disclosed as ingredients in various polish formulations in U.S. Pat. No. 3,836,371 issued Sep. 17, 1974; U.S. Pat. No. 3,890,271 issued Jun. 17, 1975; U.S. Pat. No. 3,960,575 issued Jun. 1, 1976; U.S. Pat. No. 4,013,475 issued Mar. 22, 1977; U.S. Pat. No. 4,218,250, issued Aug. 19, 1980; and in U.S. Pat. No. 4,898,614 issued Feb. 6, 1990. However, the prior art does not teach the novel silylated amines and epoxides or their use in polish formulations.

SUMMARY OF THE INVENTION

This invention is directed to a polish formulation containing as components thereof at least one member selected from the group consisting of waxes, solvents, surfactants, film formers, abrasives and other ingredients normally used in making polishes. The improvement resides in incorporating into the polish formulation as a film former an organic amine or an epoxide which has been derivatized with a siloxane or silane.

The polish formulation is preferably water based and can be in the form of a water in oil emulsion polish although the polish formulation may also be formulated in the form of an oil in water emulsion polish. The polish formulation includes as a film former at least one organosilicon detergent resistant film forming compound which is the reaction product of an organosilicon compound and a cycloaliphatic amine or epoxide.

These and other features, objects, and advantages of the herein described present invention will become more apparent from a consideration of the following detailed description thereof.

DETAILED DESCRIPTION

Waxes which may be employed in the polish formulations of this invention are well known in the art and can vary depending on the specific use intended of the polish and the properties being sought. Specific examples of suitable waxes include animal waxes such as beeswax, spermaceti, lanolin and shellac wax; vegetable waxes such as carnauba, candelilla, bayberry, and sugarcane; mineral waxes such as ozocerite, ceresin, montan, paraffin, microcrystalline and petrolatum; and synthetic waxes such as ethylenic polymers, polyol ether-esters and chlorinated naphthalenes.

Abrasives which can be used are well known in the art and suitable abrasives include aluminum silicate, diatomaceous earth, pumice, fuller's earth, bentonite, silica, tripoli, hydrated calcium silicate, chalk, colloidal clay, magnesium oxide red iron oxide, and tin oxide.

There may also be employed in the polish formulation solvents such as VM&P naphtha, Stoddard solvent, naphtha mineral spirits, water, kerosene; surfactants such as polyoxyethylene sorbitan monooleate and fatty alcohol amine sulfates; thickening agents such as soya lecithin and methyl cellulose; detergent resistant additives such as dimethyl and carboxyfunctional silicones; colorants, odorants, corrosion inhibitors and other ingredients normally used in making polishes. Such ingredients are all well known to the skilled artisan. The invention is applicable to all forms of wax and/or abrasive containing polishes including solvent based polishes, water based emulsion polishes and paste wax polishes.

The detergent resistant additives can be organic polysiloxanes which are film formers having a viscosity in the range of about five to as high as several million centistokes preferably about 100 to about 10,000 centistokes. Preferably a mixture of polysiloxanes having relatively higher and relatively lower viscosities is employed. Such polysiloxanes have the repeating unit

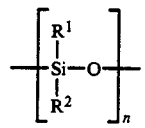

wherein n is an integer having a value greater than one, $R^1$ is an alkyl radical containing 1 to 7 carbon atoms inclusive or a phenyl group, $R^2$ is hydrogen, an alkyl radical containing 1 to 7 carbon atoms inclusive or a phenyl group. Illustrative polysiloxanes encompassed by the above formula are polydimethylsiloxane, polydiethylsiloxane, polymethylethylsiloxane, polymethylphenylsiloxane, polydiphenylsiloxane, diphenylsilanediol and copolymers of any two or more of the foregoing siloxanes. Polysiloxane-oxyalkylene block copolymers may also be utilized.

In addition to the aforementioned organic polysiloxanes, the present compositions may include an aminofunctional polysiloxane. The aminofunctional polysiloxane is a silicone fluid with highly polar pendant aminoalkyl modifying groups that enhance the durability of the film and promote adhesion of the film to a wide variety of substrates.

The present composition also contemplates an optional liquid silane constituent which promotes the mutual solubility of other organic silicone compounds present in the mixture. Suitable liquid silanes are represented by the formula $R'—Si(OR'')_3$ wherein $R'$ can be an alkyl radical containing one to three carbon atoms inclusive or phenyl, and $R''$ can be an alkyl radical containing one or two carbon atoms inclusive. A preferred liquid silane constituent is an alkyltrialkoxysilane such as methyltrimethoxysilane, ethyltriethoxysilane, phenyltrimethoxysilane, and phenyltriethoxysilane.

Aminofunctional siloxane compositions which can be included are represented by the formula:

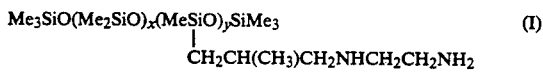

Such compositions are described in U.S. Pat. No. 3,508,933 issued Apr. 28, 1970; U.S. Pat. No. 3,836,371 issued Sep. 17, 1974, and in U.S. Pat. No. 3,890,271 issued Jun. 17, 1975.

The polish formulation in accordance with the present invention includes as the improvement a polish film former which is a derivatized polycycloaliphatic amine. The improved additive for the polish formulation is a silylated derivative of certain polycycloaliphatic amines including monosilylated and disilylated derivatives of aminoalkylcyclohexylamines and aminoaralkylcyclohexylamines. Polycycloaliphatic amines are known and are commercial products of Air Products and Chemicals, Inc., Allentown Penn. USA. Polycycloaliphatic amine compounds which are preferred in accordance with the present invention are shown as follows:

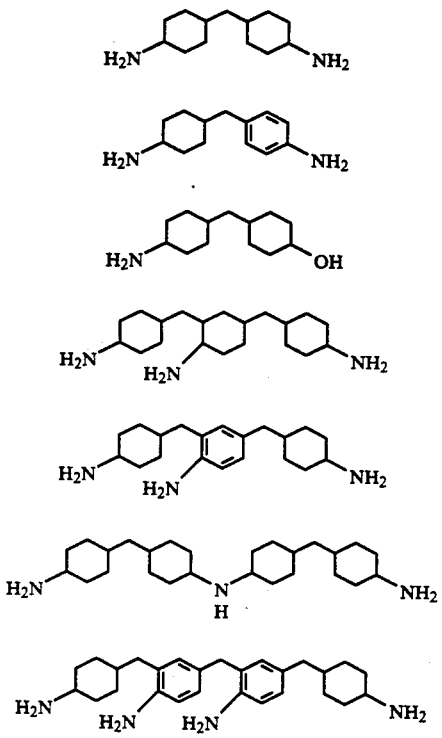

The most preferred of the above listed polycycloaliphatic amines is the first shown compound which is 4,4'-methylenebiscyclohexylamine, although other of the listed amines are appropriate for the purposes of the present invention.

The polycycloaliphatic amines are silylated by reacting the amine with an organosilicon compound which can be silane or a siloxane. Alkoxysilanes are the preferred silylating agent. The particular alkoxysilanes employed in accordance with the present invention have been described in the literature as "silane coupling agents".

Silane coupling agents are known in the art as promoters of adhesion as evidenced for example by U.S. Pat. No. 4,689,085 issued Aug. 25, 1987. Typically these materials are employed as an interface between hydrophilic mineral surfaces such as glass and silica, and organic resins in order to couple these dissimilar surfaces.

Silane coupling agents are of the general structure $X_3Si(CH_2)_nY$ in which n is an integer from zero to three, X is a hydrolyzable group on silicon, and Y is a reactive organofunctional group such as methacryloxy, epoxy, chloroalkyl, vinyl, and amino. When applied from water solutions, the hydrolyzable groups generate intermediate silanols which migrate to the hydrophilic surface where they condense with surface hydroxyl groups to form "siloxane" bonds (—SiOSi—) with the surface. It is believed that coupling is achieved with the organic resin because of the compatibility between the resin and the reactive organofunctional group Y of the silane coupling agent.

Examples of some commercial silane coupling agents are N-(2-aminoethyl)-3-aminopropyltrimethoxysilane; 3-methacryloxypropyltrimethoxysilane; N-[2-(vinylbenzylamino)ethyl]-3-aminopropyltrimethoxysilane; 3-glycidoxypropyltrimethoxysilane; vinyltriacetoxysilane; 3-chloropropyltrimethoxysilane; 2-(3,4-epoxycyclohexyl)ethyltrimethoxysilane; 3-mercaptopropyltrimethoxysilane; and 2-mercaptoethyltrimethoxysilane.

The silylated polycycloaliphatic amines are prepared in accordance with the present invention by reacting the amine and the silane coupling agent as depicted in the following reaction scheme:

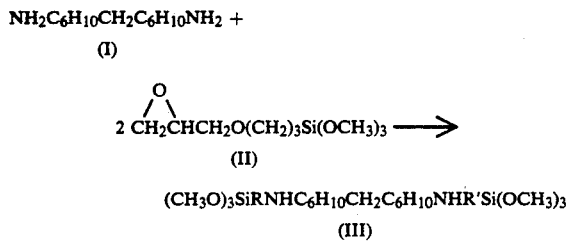

$NH_2C_6H_{10}CH_2C_6H_{10}NH_2 +$
(I)

$2\ CH_2CHCH_2O(CH_2)_3Si(OCH_3)_3 \longrightarrow$
(II)

$(CH_3O)_3SiRNHC_6H_{10}CH_2C_6H_{10}NHR'Si(OCH_3)_3$
(III)

wherein R is $-(CH_2)_3OCH_2CH(OH)CH_2-$, and R' is $-CH_2CH(OH)CH_2O(CH_2)_3-$.

In the above equation, the reaction product (III) is a silylated polycycloaliphatic amine in accordance with the present invention, and is formed by combining the amine (I) which is 4,4'-methylenebiscyclohexylamine and the silane coupling agent (II) which is 3-glycidoxypropyltrimethoxysilane. Silane coupling agents most preferred for use in accordance with the present invention are 3-methacryloxypropyltrimethoxysilane, 3-glycidoxypropyltrimethoxysilane, and 3-chloropropyltrimethoxysilane.

The following examples are set forth in order to illustrate the present invention in more detail.

EXAMPLE 1

Approximately 112.4 grams of glycidoxypropyl trimethoxysilane was added to an 8 ounce jar containing 50 grams of 4,4'-methylenebiscyclohexylamine and allowed to stir continuously overnight at room temperature (approximately 25° C.).

EXAMPLE 2

Approximately 78.6 grams of kerosene, 6.06 grams Aquabead ® 519, 3.06 grams of Witcamide ® 511, and 12.14 grams of the fluid described in Example 1 were combined and thoroughly mixed to comprise the oil phase of a polish formulation. This mixture was added to a water phase comprised of 30 grams Kaopolite 1152 suspended in 170.5 grams of water. The oil phase was stirred during addition of the water phase and allowed to continue once addition was complete until the emulsion was well formed and stable.

EXAMPLE 3

The polish described in Example 2 and NuFINISH ® a commercially available polish known for its ease of use characteristics and durability were applied to the surface of a 1991 Chevrolet Caprice. The conditions during application of the polish included an air temperature of 60° F., RH=54%, and a surface temperature of 115° F. A light breeze was also noted. Both polishes applied easily to the car surface. After 30 minutes both polishes were buffed to produce the resultant polish films. Both polishes were easy to buff but the commercial polish exhibited slightly more drag. The experimental polish exhibited a light degree of dusting, whereas the commercially available polish exhibited a light-to-moderate level of dusting during the buffing step. The film produced by the experimental polish was glossy and homogeneous in appearance.

In Example 2, WITCAMIDE ® 511 is a trademark and a modified alkanolamide surfactant available from the Witco Corporation Organics Division, New York, N.Y. Kaopolite 1152 is an aluminum silicate abrasive, and AQUABEAD ® 519 is a micronized wax.

The film former of the present invention may also be produced by reacting a silane coupling agent with a cycloaliphatic or a polycycloaliphatic epoxide. These compounds are known in the art and are commercially available from the Union Carbide Chemicals and Plastics Company Inc., Danbury, Conn. Representative cycloaliphatic and polycycloaliphatic epoxides are vinyl cyclohexene dioxide, 2-[3,4-epoxycyclohexyl-5,5-spiro-3,4-epoxy]cyclohexane-meta dioxane, bis-[3,4-epoxycyclohexyl] adipate, 1,2-epoxy-p-vinylcyclohexene, and 3,4-epoxycyclohexylmethyl-3,4-epoxycyclohexane-carboxylate.

The film former of the present invention is prepared by combining, in the case of the cycloaliphatic amine, 0.1 to 4.0 moles of the silane coupling agent per mole of reactive NH functional group of the cycloaliphatic amine. Preferably, there is employed 0.25 to 2.0 moles of the silane coupling agent per mole of reactive NH functional group of the cycloaliphatic amine. Most preferred is 0.4 to 1.0 mole of the silane coupling agent per mole of reactive NH functional group of the cycloaliphatic amine.

Where the film former is a reaction product of a silane coupling agent and a cycloaliphatic epoxide, the film former of the present invention is prepared by combining 0.01 to 10.0 moles of the silane coupling agent per mole of reactive oxirane functional group of the cycloaliphatic epoxide. Preferably, there is employed 0.10 to 3.5 moles of the silane coupling agent per mole of reactive oxirane functional group of the cycloaliphatic epoxide. Most preferred is 0.5 to 1.5 moles of the silane coupling agent per mole of reactive oxirane functional group of the cycloaliphatic epoxide.

The following additional examples are set forth in order to illustrate further features of the invention.

EXAMPLE 4

125.00 g. of 4,4'-methylenebiscyclohexylamine was weighed directly to a quart glass jar. 281.00 g. of 3-glycidoxypropyltrimethoxysilane was added and the resulting clear, colorless, low viscosity mixture was allowed to react overnight. From the above mixture, 100.01 g. was weighed to a glass 8 oz. bottle, and there was added 100.04 g. of 1-butanol. The resulting mixture was clear, colorless, and exhibited low viscosity.

EXAMPLE 5

An oil-in-water auto polish formulation was made in the following manner. In a 500 ml. stainless steel beaker was weighed 3.0 parts Hoescht "S" wax, 1.0 parts Hoescht "E" wax, 1 part stearic acid, 15 parts mineral spirits, and 11.9 parts kerosene. This mixture was heated to approximately 80° C. to melt the waxes, and 0.8 parts Morpholine was added and allowed to react for 5 min. To this mixture was added a pre-made mixture of 6 parts mineral spirits, 2 parts of the composition from Example 4, and 3 parts of one thousand centistoke polydimethylsiloxane fluid. The mixture was maintained at approximately 80° C. mixed, while a separate water phase of 48.3 parts water and 8 parts of Kaopolite 1152 was made and heated to approximately 80° C. in a 500 ml. stainless steel beaker. After the separate phases were completely mixed, the solution of water and Kaopolite was slowly added to the solvent mixture with constant agitation. When the two phases were completely mixed together, the container and contents were cooled in an ice bath with constant agitation forming a smooth, thick and creamy, oil-in-water auto polish.

EXAMPLE 6

To 10.00 g. of ethylenediamine contained in a 4 oz. glass bottle, was added 78.71 g. of glycidoxypropyltrimethoxysilane. The bottle was capped with a polyseal cap and agitated by hand to mix. The resulting clear, straw-colored, low viscosity fluid was then mixed overnight on a rotating mixing wheel.

EXAMPLE 7

To 16.04 g. of Cymel® 1158 contained in a 4 oz. glass bottle, was added 23.63 g. of glycidoxypropyltrimethoxysilane. The bottle was capped with a polyseal cap and agitated by hand to mix. The resulting clear, colorless, low viscosity fluid was then mixed overnight on a rotating mixing wheel. Cymel® 1158 is a melamine resin and a product of American Cyanamid Co., Wayne, N.J.

EXAMPLE 8

Approximately 10.00 g. of hexylenediamine contained in a 4 oz. glass bottle, was heated to 70° C. followed by addition of 40.70 g. of glycidoxypropyltrimethoxysilane. The bottle was capped with a polyseal cap and agitated by hand to mix. The initially cloudy, colorless, moderate viscosity fluid was mixed for four hours on a rotating mixing wheel by which time the fluid had cleared. The fluid was diluted in n-butanol and mixed thoroughly. The resulting fluid was clear, colorless and of low viscosity.

EXAMPLE 9

About 20.04 grams of bis[3,4-epoxycyclohexy]adipate was combined with 22.24 g. of aminoethylaminopropyltrimethoxysilane and mixed for two days on a rotating mixing wheel. The initial blend was clear, colorless, and of moderate viscosity. After two days, 10.01 g. of Succinic anhydride was added and the fluid remained clear. This material was diluted to 50% in n-butanol to lower the viscosity.

EXAMPLE 10

Example 2 was repeated and several water-in-oil polishes I-IV were prepared using the silylated derivatives of Examples 6-9. The polish formulations I-IV are shown in the table below, and all of the polish formulations I-IV resulted in low viscosity liquid polishes.

TABLE

| Ingredient | Grams of Ingredients | | | |
|---|---|---|---|---|
| | I | II | III | IV |
| Water | 170.4 | 170.4 | 170.4 | 170.4 |
| Kaopolite 1152 | 30.0 | 30.0 | 30.0 | 30.0 |
| Kerosene | 78.6 | 66.6 | 78.6 | 66.6 |
| Aquabead® 519 | 6.0 | 6.0 | 6.0 | 6.0 |
| Silicone Glycol Emulsifier | 3.0 | — | — | 3.0 |
| Witcamide® 511 | — | 3.0 | 3.0 | — |
| Derivative of Example 6 | 12.0 | — | — | — |
| Derivative of Example 7 | — | 24.0 | — | — |
| Derivative of Example 8 | — | — | 12.0 | — |
| Derivative of Example 9 | — | — | — | 24.0 |
| Total | 300.0 | 300.0 | 300.0 | 300.0 |

Micronized wax particles employed in the polish formulations of the present invention may be made from any conventional wax but preferably micronized particles of Fischer-Tropsch waxes, polyethylene wax, polyethylenepolytetrafluorethylene wax, polytetrafluorethylene wax, polypropylene wax, natural waxes, mineral waxes, montan wax derivatives, fatty acid derivatives, amide waxes and wax mixtures. The particle size of the micronized wax particles may vary from an average diameter of about two microns to about thirty to forty-five microns although particles sizes of from two to five microns are preferred. Such micronized wax particles are manufactured by Micro Powders, Inc., Scarsdale, N.Y. Other micronized wax particles suitable for incorporation into the polish formulations of the present invention are disclosed in U.S. Pat. No. 4,846,887, issued Jul. 11, 1989.

The polish formulations in accordance with the present invention are preferably in the form of an emulsion and include an oil phase containing a solvent, an organosilicon detergent resistant film forming derivatized amine functional compound, a surfactant and a wax. The water phase can include water, an abrasive, a freeze thaw additive such as propylene glycol and sodium borate, and colorants. Water in oil emulsions are preferred however oil in water emulsions are also included herein. It has been found that the polish formulations of the present invention possess the advantage in that the polish provides improved protection for an automotive top coat against abrasion and corrosion and produces a coating which is light stable in comparison to conventional and prior art polish formulations which do not contain the derivatized amines.

The polishes of the present invention are of general application including such surfaces as motor vehicles, boats and navigable crafts, wood surfaces, plastic surfaces and fiber surfaces. The films produce a high durable gloss and are easy to apply.

The silylated polycycloaliphatic amines of the present invention possess the advantage in that colorless films can be produced in contrast to silylated polyaromatic amines which produce chromophores because of the aromaticity.

It will be apparent from the foregoing that many other variations and modifications may be made in the structures, compounds, compositions and methods described herein without departing substantially from the essential features and concepts of the present invention. Accordingly it should be clearly understood that the forms of the invention described herein are exemplary only and are not intended as limitations on the scope of the present invention.

That which is claimed is:

1. In a polish formulation containing as components thereof at least one member selected from the group consisting of waxes, solvents, surfactants, thickening agents, abrasives, colorants, odorants, and other ingredients normally used in making polishes, the improvement comprising incorporating into the polish formulation an additive which is the reaction product of an organosilicon compound and a polycycloaliphatic amine.

2. The polish of claim 1 in which the organosilicon compound is an alkoxysilane.

3. The polish of claim 2 in which the alkoxysilane is selected from the group consisting of 3-methacryloxypropyltrimethoxysilane, 3-glycidoxypropyltrimethoxysilane, and 3-chloropropyltrimethoxysilane.

4. The polish of claim 1 in which the polycycloaliphatic amine is selected from the group consisting of aminoalkylcyclohexylamines and aminoaralkylcyclohexylamines.

5. The polish of claim 4 in which the polycycloaliphatic amine has a formula selected from the group consisting of:

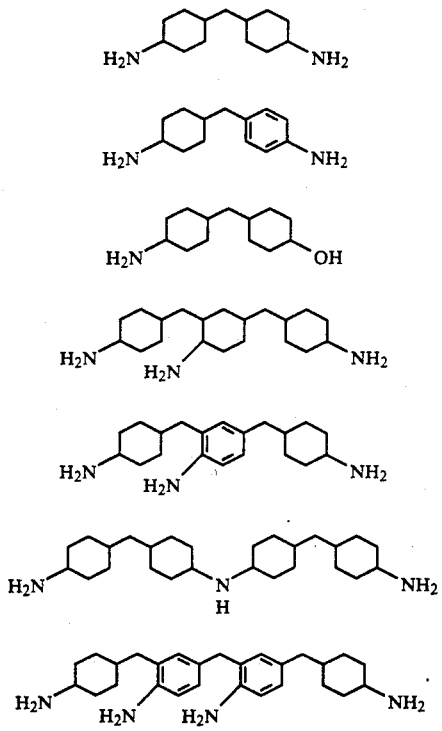

6. The polish of claim 5 in which the polycycloaliphatic amine is 4,4'-methylenebiscyclohexylamine.

7. The polish of claim 1 in which the formulation is in the form of a water in oil emulsion.

8. In a polish composition for use in the treatment of surfaces for producing a glossy finish thereon, the polish composition being in the form of an emulsion and containing a film forming material, the improvement comprising a film forming material which is the reaction product of (i) a silane coupling agent having the formula $X_3Si(CH_2)_nY$ in which n has a value of zero to three, X is a hydrolyzable group on silicon, and Y is a reactive organofunctional group, and (ii) a polycycloaliphatic amine selected from the group consisting of aminoalkylcyclohexylamines, aminoaralkylcyclohexylamines, and mixtures of aminoalkylcyclohexylamines and aminoaralkylcyclohexylamines.

9. A composition according to claim 8 in which the silane coupling agent is selected from the group consisting of N-(2-aminoethyl)-3-aminopropyltrimethoxysilane, 3-methacryloxypropyltrimethoxysilane, N-[2-(vinylbenzylamino)ethyl]-3-aminopropyltrimethoxysilane, 3-glycidoxypropyltrimethoxysilane, vinyltriacetoxysilane, 3-chloropropyltrimethoxysilane, 2-(3,4-epoxycyclohexyl)-ethyltrimethoxysilane, 3-mercaptopropyltrimethoxysilane, and 2-mercaptoethyltrimethoxysilane.

10. A composition according to claim 9 in which the silane coupling agent is 3-glycidoxypropyltrimethoxysilane.

11. A composition according to claim 8 in which the reaction product is selected from the group consisting of monosilylated and disilylated derivatives of the silane coupling agent and the polycycloaliphatic amine.

12. A composition according to claim 8 in which the polycycloaliphatic amine is a compound having a formula selected from the group consisting of

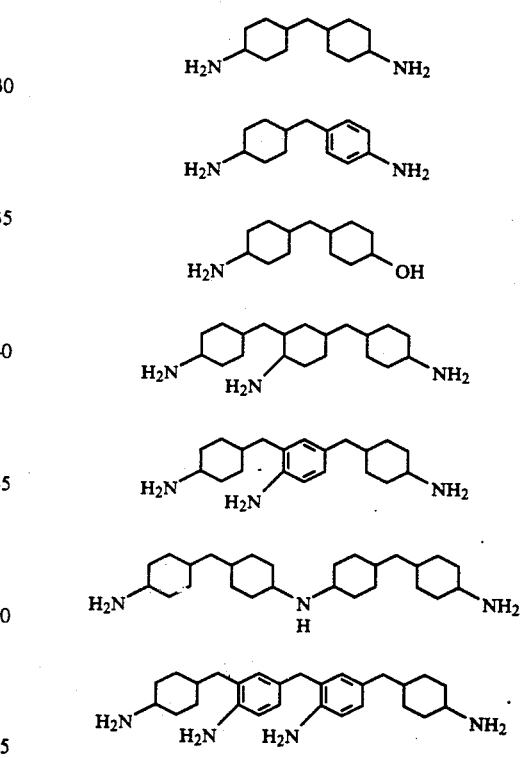

13. A composition according to claim 12 in which the polycycloaliphatic amine is 4,4'-methylenebiscyclohexylamine.

14. A composition according to claim 1 in which the wax is in the form of micronized wax particles having a diameter of 2-45 microns.

15. In a polish formulation containing as components thereof at least one member selected from the group consisting of waxes, solvents, surfactants, thickening agents, abrasives, colorants, odorants, and other ingredients normally used in making polishes, the improvement comprising incorporating into the polish formulation an additive which is the reaction product of an organosilicon compound and a cycloaliphatic epoxide.

16. The polish of claim 15 in which the organosilicon compound is an alkoxysilane.

17. The polish of claim 16 in which the alkoxysilane is selected from the group consisting of 3-methacryloxypropyltrimethoxysilane, 3-glycidoxypropyltrimethoxysilane, and 3-chloropropyltrimethoxysilane.

18. A polish according to claim 15 in which the cycloaliphatic epoxide is a compound selected from the group consisting of vinyl cyclohexene dioxide, 2-[3,4-epoxycyclohexyl-5,5-spiro-3,4-epoxy]cyclohexane-meta dioxane, bis-[3,4-epoxycyclohexyl]adipate, 1,2-epoxy-p-vinylcyclohexene, and 3,4-epoxycyclohexyl-methyl-3,4-epoxy-cyclohexane-carboxylate.

19. In a polish composition for use in the treatment of surfaces for producing a glossy finish thereon, the polish composition being in the form of an emulsion and containing a film forming material, the improvement comprising a film forming material which is the reaction product of (i) a silane coupling agent having the formula $X_3Si(CH_2)_nY$ in which n has a value of zero to three, X is a hydrolyzable group on silicon, and Y is a reactive organofunctional group, and (ii) a cycloaliphatic epoxide.

20. A composition according to claim 19 in which the silane coupling agent is selected from the group consisting of N-(2-aminoethyl)-3-aminopropyltrimethoxysilane, 3-methacryloxypropyltrimethoxysilane, N-[2-(vinylbenzylamino)ethyl]-3-aminopropyltrimethoxysilane, 3-glycidoxypropyltrimethoxysilane, vinyltriacetoxysilane, 3-chloropropyltrimethoxysilane, 2-(3,4-epoxycyclohexyl)-ethyltrimethoxysilane, 3-mercaptopropyltrimethoxysilane, and 2-mercaptoethyltrimethoxysilane.

21. A composition according to claim 19 in which the cycloaliphatic epoxide is a compound selected from the group consisting of vinyl cyclohexene dioxide, 2-[3,4-epoxycyclohexyl-5,5-spiro-3,4-epoxy]cyclohexane-meta dioxane, bis-[3,4-epoxycyclohexyl]adipate, 1,2-epoxy-p-vinylcyclohexane, and 3,4-epoxycyclohexyl-methyl-3,4-epoxy-cyclohexane-carboxylate.

* * * * *